(12) United States Patent
Ahn et al.

(10) Patent No.: US 11,016,350 B2
(45) Date of Patent: May 25, 2021

(54) ELECTRONIC DEVICE COMPRISING AN ADHESIVE MEMBER HAVING A PLURALITY OF CONDUCTIVE FIBER SHEETS FORMED OF A METAL MATERIAL COATED ON A NON-CONDUCTIVE POLYMER FIBER SHEET

(71) Applicant: LG DISPLAY CO., LTD., Seoul (KR)

(72) Inventors: YounSeok Ahn, Goyang-si (KR); SungHyun Bae, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 500 days.

(21) Appl. No.: 15/842,585

(22) Filed: Dec. 14, 2017

(65) Prior Publication Data

US 2018/0180925 A1   Jun. 28, 2018

(30) Foreign Application Priority Data

Dec. 23, 2016   (KR) ........................ 10-2016-0178188

(51) Int. Cl.
| | |
|---|---|
| *G02F 1/1345* | (2006.01) |
| *G02F 1/1333* | (2006.01) |
| *G02F 1/1343* | (2006.01) |
| *G02F 1/133* | (2006.01) |
| *C09J 9/02* | (2006.01) |
| *G02F 1/1335* | (2006.01) |

(52) U.S. Cl.
CPC ............ *G02F 1/13458* (2013.01); *C09J 9/02* (2013.01); *G02F 1/13306* (2013.01); *G02F 1/133305* (2013.01); *G02F 1/133526* (2013.01); *G02F 1/134309* (2013.01); *G02F 2202/28* (2013.01)

(58) Field of Classification Search
CPC ......... C09J 2201/128; C08K 2003/085; C08K 2003/0862; G02F 1/13458
See application file for complete search history.

(56) References Cited

U.S. PATENT DOCUMENTS 6,617,521 B1   9/2003 Saito et al.
8,309,210 B1   11/2012 Keen
(Continued)

FOREIGN PATENT DOCUMENTS

CN   1959970 A   5/2007
CN   102749717 A   10/2012
(Continued)

*Primary Examiner* — Paul C Lee
(74) *Attorney, Agent, or Firm* — Seed IP Law Group LLP (57) ABSTRACT

An electronic device according to an example embodiment of the present disclosure includes a first substrate, a conductive layer formed on the first substrate, a first pad electrode that is electrically connected to and extends from the conductive layer, a second substrate electrically connected to the first pad electrode, and an adhesive member disposed between the first pad electrode and the second substrate. The adhesive member includes a conductive fiber sheet. The electronic device according to various embodiments of the present disclosure uses an adhesive member which includes a plurality of conductive fiber sheets and an adhesive layer having an adhesive and conductive particles. Therefore, it is possible to easily attach electronic parts at a low temperature and a low pressure and minimize damages of the pad electrode and the substrate of the electronic parts which may be caused during the adhering process.

13 Claims, 6 Drawing Sheets

(56) References Cited

U.S. PATENT DOCUMENTS

| | | | |
|---|---|---|---|
| 2006/0087479 A1* | 4/2006 | Sakurai | G02F 1/167 345/48 |
| 2006/0163724 A1 | 7/2006 | Hwang et al. | |
| 2007/0094872 A1* | 5/2007 | Konishi | H05K 3/323 29/840 |
| 2008/0078574 A1 | 4/2008 | Kang et al. | |
| 2008/0089018 A1 | 4/2008 | Kim et al. | |
| 2011/0176074 A1 | 7/2011 | Ge et al. | |
| 2012/0027994 A1* | 2/2012 | Takada | B32B 27/12 428/141 |
| 2013/0196129 A1* | 8/2013 | Lee | C09J 9/02 428/212 |
| 2013/0314883 A1* | 11/2013 | Ling | H05K 1/189 361/749 |
| 2014/0028933 A1 | 1/2014 | Chen et al. | |
| 2015/0160467 A1 | 6/2015 | Kim | |
| 2015/0370113 A1* | 12/2015 | Kim | G02F 1/13336 361/679.21 |

FOREIGN PATENT DOCUMENTS

| | | | |
|---|---|---|---|
| CN | 203552219 U | | 4/2014 |
| EP | 0 147 856 A2 | | 7/1985 |
| EP | 0 256 756 A2 | | 2/1988 |
| EP | 1 895 585 A2 | | 3/2008 |
| JP | 62-115678 A | | 5/1987 |
| JP | 6-302657 A | | 10/1994 |
| JP | 11-7254 A | | 1/1999 |
| JP | 2003109691 A | * | 4/2003 |
| JP | 2011228243 A | * | 11/2011 |
| KR | 10-2012-0028583 A | | 3/2012 |
| KR | 10-2016-0039101 A | | 4/2016 |
| KR | 10-2016-0059059 A | | 5/2016 |
| TW | 201227052 A1 | | 7/2012 |

* cited by examiner

ELECTRONIC DEVICE COMPRISING AN ADHESIVE MEMBER HAVING A PLURALITY OF CONDUCTIVE FIBER SHEETS FORMED OF A METAL MATERIAL COATED ON A NON-CONDUCTIVE POLYMER FIBER SHEET

CROSS-REFERENCE TO RELATED APPLICATIONS

This application claims the priority of Korean Patent Application No. 10-2016-0178188 filed on Dec. 23, 2016, in the Korean Intellectual Property Office, the disclosure of which is incorporated herein by reference.

BACKGROUND

Technical Field

The present disclosure relates to an electronic device and a display device including the same, and more particularly, to an electronic device including an adhesive member which is capable of being adhered at a low temperature and a low pressure and minimizing a damage of electronic parts which may be generated during an adhering process and a display device including the same.

Description of the Related Art

An adhesive used during a manufacturing process of various electronic devices is classified into a film type and a paste type depending on a usage type, and also may be classified into a conductive type, an anisotropic conductive type, and a non-conductive type depending on whether conductive particles are included. Specifically, the adhesive may be classified as an anisotropic conductive film (ACF), an anisotropic conductive paste (ACP), a non-conductive film (NCF), and a non-conductive paste (NCP).

Among these, the anisotropic conductive film is an adhesive in which conductive particles are dispersed in a binder resin having stickiness and connects electronic parts through thermal compression bonding. Specifically, a mechanical adhesion between electronic parts is performed by thermal curing of the binder resin and an electrical connection between the electronic parts is performed by thermal compression bonding of the conductive particles dispersed in a polymer resin. Specifically, the anisotropic conductive film is advantageous in that the process is simple and eco-friendly as compared with a soldering process of the related art. Therefore, the anisotropic conductive film is widely used for electronic devices including a display device such as a liquid crystal display device or an organic light emitting display device and a mobile device such as a portable phone, a PDA, or a smart phone.

In the meantime, various electronic devices have been studied to be easily carried or aesthetically thinner in accordance with demands of consumers. Further, in a display device field, studies for implementing a flexible display device are being performed. One method for implementing a thinner electronic device and flexibility thereof is to use a thin and flexible substrate using a polymer based plastic as a substrate which supports components of the electronic device.

However, when plastic substrate based electronic parts are adhered using an anisotropic conductive film, there are problems in that a metal pad electrode is cracked or the plastic substrate is burned. Specifically, in a thermal compression bonding process, which is necessary for the anisotropic conductive film, a pressure is applied to the pad electrode due to conductive metal particles in the anisotropic conductive film which causes a crack in the pad electrode or the film may be burned or melted during a heating process.

BRIEF SUMMARY

In various embodiments, the present disclosure provides an electronic device including an adhesive member which adheres the electronic parts during a low temperature and low pressure process.

Further, the present disclosure provides an electronic device which may minimize damages caused in a pad electrode and a substrate during an adhering process between electronic parts.

Moreover, the various embodiments provided by the present disclosure facilitate easy adherence of a pad electrode and a flexible printed circuit board in a display device including a switchable lens.

Objects of the present disclosure are not limited to the above-mentioned objects, and other objects, which are not mentioned above, can be clearly understood by those skilled in the art from the following descriptions.

According to one embodiment of the present disclosure, there is provided an electronic device. The electronic device includes a first substrate, a conductive layer formed on the first substrate, a first pad electrode that is electrically connected to and extends from the conductive layer, a second substrate which is electrically connected to the first pad electrode, and an adhesive member disposed between the first pad electrode and the second substrate. In this case, the adhesive member includes a conductive fiber sheet. The electronic device according to one or more embodiments of the present disclosure uses an adhesive member which includes a plurality of conductive fiber sheets and an adhesive layer having an adhesive and conductive particles. Therefore, it is possible to easily attach electronic parts at a low temperature and a low pressure and minimize damages of the pad electrode and the substrate of the electronic parts which may be caused during the adhering process.

According to another embodiment of the present disclosure, there is provided a display device. The display device includes a display panel including a display area in which a display unit is disposed and a non-display area which surrounds a perimeter of the display area, a polarization control unit which is disposed on the display panel and includes a polarization control liquid crystal layer, and a switchable lens which refracts or transmits light passing through the polarization control unit. In this case, the polarization control unit includes a first plastic substrate, a second plastic substrate opposite to the first plastic substrate, a first electrode disposed on one surface of the first plastic substrate, a second electrode disposed on one surface of the second plastic substrate, and the polarization control liquid crystal layer is disposed between the first plastic substrate and the second plastic substrate. The polarization control unit includes a pad electrode that is electrically connected to and extends from at least one of the first electrode and the second electrode. The pad electrode is electrically connected to a flexible printed circuit board by an adhesive member including a plurality of conductive fiber sheets and an adhesive layer which is disposed on opposite surfaces of the plurality of conductive fiber sheets and includes conductive particles and an adhesive.

Other detailed features of the example embodiments are included in the detailed description and the drawings.

According to the present disclosure, it is possible to provide an electronic device including an adhesive member which adheres the electronic parts during a low temperature and low pressure process.

Further, according to the present disclosure, an adhesive member including a plurality of conductive fiber sheets and an adhesive layer having an adhesive and conductive particles is used so that damages caused in a pad electrode and a substrate during an adhering process between the electronic parts may be minimized.

Further, according to the present disclosure, in a display device including a switchable lens, a pad electrode and a flexible printed circuit board may be easily adhered to each other.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Advantages and characteristics of the present disclosure and a method of achieving the advantages and characteristics will be clear by referring to example embodiments described below in detail together with the accompanying drawings. However, the present disclosure is not limited to example embodiments disclosed herein but will be implemented in various forms. The example embodiments are provided by way of example only so that a person of ordinary skill in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the example embodiments of the present disclosure are merely examples, and the present disclosure is not limited thereto. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are expressly limited, for example, by the terms such as "immediately" or "directly".

When an element or layer is disposed "on" another element or layer, one or more additional layers or elements may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawings are illustrated for convenience of description, and the present disclosure is not limited to the size and the thickness of the component illustrated.

In this specification, an electronic device refers to an electronic device in which various electronic parts are electrically connected to each other through metal wiring lines and a type of the electronic device is not specifically limited. However, in the specification, as an example of the electronic device, a display device will be mainly described.

The features of various embodiments of the present disclosure can be partially or entirely adhered to or combined with each other and can be interlocked and operated in technically various ways as understood by those skilled in the art, and the embodiments can be carried out independently of or in association with each other.

Hereinafter, various example embodiments of the present disclosure will be described in detail with reference to accompanying drawings.

Figure 1A:
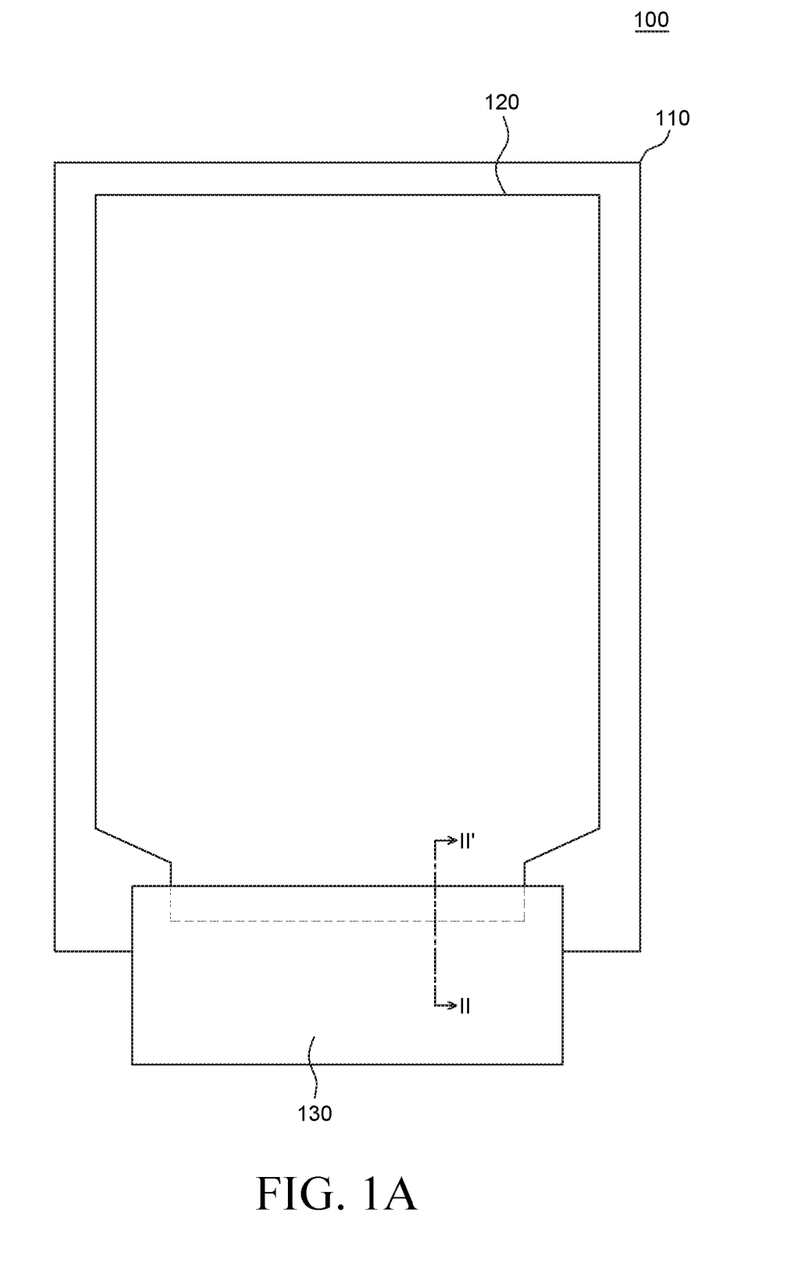
FIG. 1A is a schematic plan view of an electronic device according to one or more embodiments of the present disclosure.
Figure 1B:
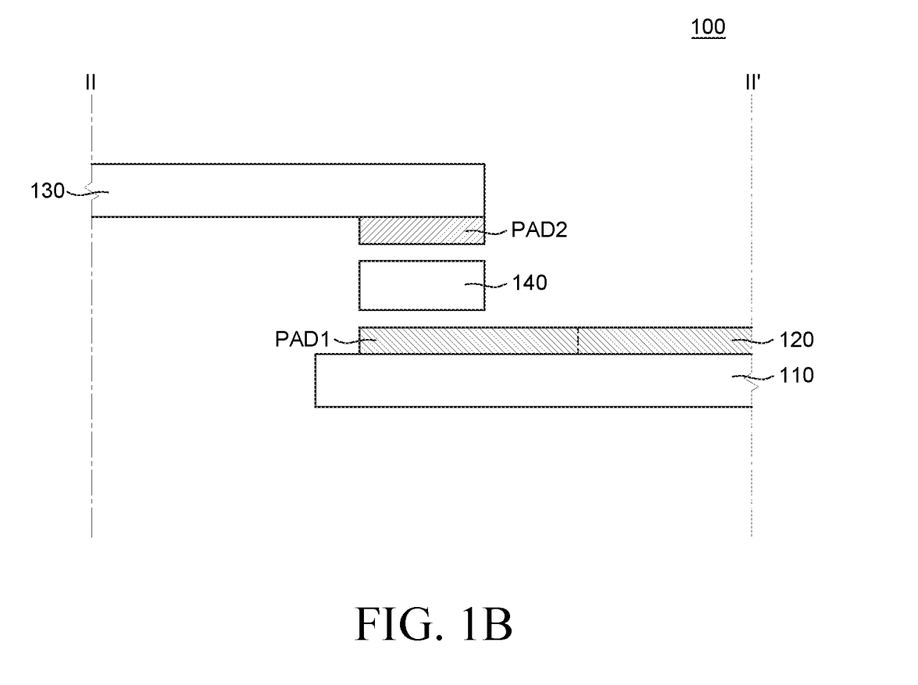
FIG. 1B is a cross-sectional view taken along the line II-IF of FIG. 1A.

FIG. 1A is a schematic plan view of an electronic device according to an example embodiment of the present disclosure and FIG. 1B is a cross-sectional view taken along the line II-IF of FIG. 1A. Referring to FIGS. 1A and 1B, an electronic device 100 includes a plastic substrate 110, a conductive layer 120, pad electrodes PAD1 and PAD2, a second substrate 130, and an adhesive member 140.

In FIGS. 1A and 1B, it is described that the electronic device 100 only includes the plastic substrate 110, the conductive layer 120, the pad electrodes PAD1 and PAD2, the second substrate 130, and the adhesive member 140. However, additional various components may be further included in the electronic device 100 according to an object, a purpose, and a function of the electronic device 100.

The plastic substrate 110 is a substrate which supports several components of the electronic device 100. The plastic substrate 110 may be formed of a polymer film to implement a thinner or flexible substrate. For example, the plastic substrate 110 may be implemented by a film formed of a polymer such as polyethylene terephthalate (PET), polycarbonate (PC), polyimide, or polyethylene naphthalate (PEN).

The conductive layer 120 is disposed on the plastic substrate 110. The conductive layer 120 may be an electrode which applies an electric field or a voltage to various components in the electronic device 100 or a wiring line which transmits an electric signal. Even though in FIG. 1A, it is illustrated that the conductive layer 120 is configured as a single electrode which is disposed on an entire surface of the plastic substrate 110, the conductive layer 120 may be configured of a plurality of patterned electrodes. Further, when the conductive layer 120 is a wiring line, a single wiring line may be formed on the plastic substrate 110 or a plurality of wiring lines may be formed.

The conductive layer 120 may be formed of a metal having excellent conductivity to apply an electric signal or a voltage. Further, the conductive layer 120 may be formed of a single metal layer structure or formed of a multilayered structure in which a plurality of metal layers is laminated.

The conductive layer 120 extends to one side or edge region of the plastic substrate 210 to be connected to the pad electrode PAD1. The pad electrode PAD1 is an area to which the second substrate 130 is attached to electrically connect circuitry on or in the second substrate 130 and the conductive layer 120. Referring to FIGS. 1A and 1B, the pad electrode PAD1 may be a metal layer which extends from the conductive layer 120 formed on the plastic substrate 110 to be integrally formed.

The pad electrode PAD1 may be a single pad electrode formed of a single electrode. When the conductive layer 120 formed on the plastic substrate 110 is configured by a plurality of wiring lines and/or a plurality of patterned electrodes, each of the wiring lines and/or electrodes extends to at least one corner of the plastic substrate 110 to be connected to the single pad electrode PAD1.

The second substrate 130 is disposed on the pad electrode PAD1. The second substrate 130 may include or otherwise be electrically connected to circuitry that, when electrically connected to the pad electrode PAD1, may supply electrical signals to electronic components on the plastic substrate 110. For example, the second substrate 130 may be a driving unit which supplies a signal to various electronic parts which may be disposed on the plastic substrate 110 or a film connected to the driving unit. For example, the second substrate 130 may be an integrated circuit chip (IC chip) including a driving unit. The integrated circuit chip may be connected to the pad electrode PAD1 to be mounted on an upper surface of the plastic substrate 110. Further, the second substrate 130 may be a flexible circuit film which is connected to a printed circuit board (PCB) on which the driving unit is disposed. The flexible circuit film transmits signals from the printed circuit board to the conductive layer 120. A plurality of wiring lines may be disposed on the flexible circuit film or in the flexible circuit film so that the printed circuit board and the pad electrode PAD1 are electrically connected to each other. In the meantime, the flexible circuit film may be a flexible printed circuit board (FPCB) in which a separate printed circuit board is not attached, but the flexible circuit film itself serves as a printed circuit board.

The second substrate 130 includes a separate pad electrode PAD2 to be electrically connected to the pad electrode PAD1 on the plastic substrate 110. Therefore, the electric signal is transmitted from the pad electrode PAD2 of the second substrate 130 to the pad electrode PAD1 of the plastic substrate 110.

The adhesive member 140 is disposed between the second substrate 130 and the plastic substrate 110. In particular, the adhesive member 140 is disposed between the pad electrode PAD2 of the second substrate 130 and the pad electrode PAD1 of the plastic substrate 110. The adhesive member 140 mechanically attaches and electrically connects the second substrate 130 and the plastic substrate 110 to each other, simultaneously. The adhesive member 140 includes a conductive fiber sheet 141 and an adhesive layer 142. The adhesive member will be specifically described with reference to FIGS. 2A and 2B.

Figure 2A:
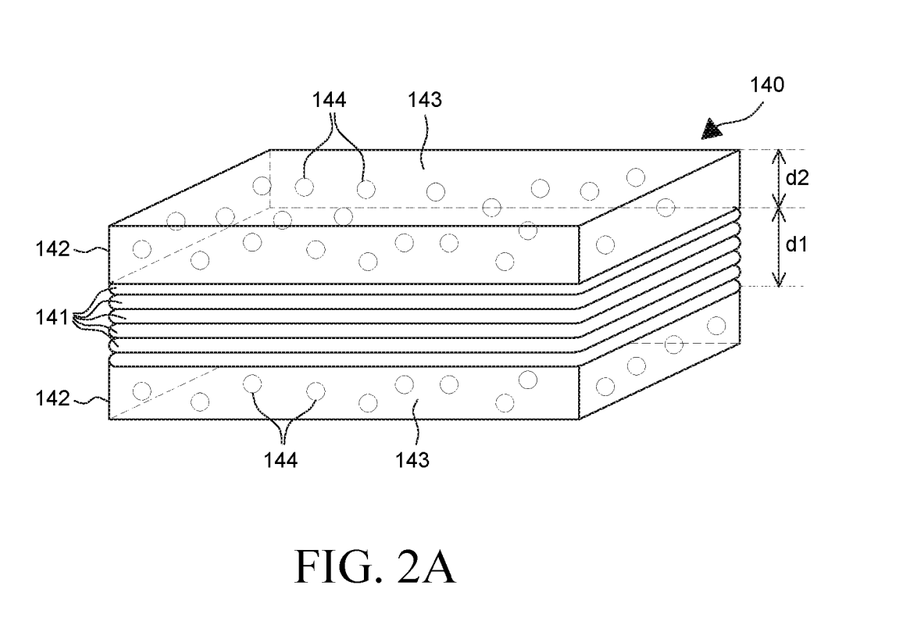
FIG. 2A is a schematic perspective view of an adhesive member used for an electronic device according to embodiments of the present disclosure.

FIG. 2A is a schematic perspective view of an adhesive member 140 used for an electronic device according to an example embodiment of the present disclosure. Referring to FIG. 2A, the adhesive member 140 includes a plurality of conductive fiber sheets 141 and an adhesive layer 142. The adhesive layer 142 includes an adhesive 143 and conductive particles 144 dispersed in the adhesive 143.

Each of the conductive fiber sheets 141 is formed by coating a metal material on a polymer fiber sheet. A current may easily flow along the fiber sheet by the coated metal material.

The polymer fiber may be formed of a non-conductive polymer. For example, the polymer fiber may be polyolefin, polyamide, polyester, aramide, acryl, polyethylene oxide (PEO), polycaprolactone, polycarbonate, polystyrene, polyethylene terephthalate, or a mixture thereof, but is not limited thereto.

As a metal material which is coated on a polymer fiber sheet, any metal material having a conductivity that is suitably high may be utilized, and the metal material is not specifically limited to any particular metal material. As the metal material coated on the polymer fiber sheet, a metal having a lower resistance is more advantageous. For example, copper (Cu), nickel or a combination thereof may be used. When the polymer fiber sheet is formed of the same metal material as the conductive particles 144 dispersed in the adhesive layer 142, it is advantageous for conductivity.

A thickness d1 of the conductive fiber sheet 141 may be appropriately adjusted as desired for various implementations, and may be within a range from 4 µm to 7 µm. When the thickness d1 of the conductive fiber sheet 141 satisfies the above-mentioned range, the conductive fiber sheet 141 may maintain sufficient conductivity without being easily torn due to a physical impact.

The adhesive layer 142 is disposed on an upper surface and a lower surface of the plurality of conductive fiber sheets 141. Referring to FIG. 2A, a first adhesive layer is disposed on the lower surface of the plurality of conductive fiber sheets 141 and a second adhesive layer is disposed on the upper surface of the plurality of conductive fiber sheets 141. Each of the first adhesive layer and the second adhesive layer includes the adhesive 143 and the conductive particles 144.

The adhesive 143 may be formed of a binder resin having stickiness. For example, the adhesive 143 may be an acrylic resin, a methacrylic resin, a polyisoprene, a vinyl resin, an epoxy resin, a urethane resin, a cellulosic resin, or a combination thereof, but is not limited thereto.

The conductive particles 144 may be copper (Cu), nickel (Ni), silver (Ag), gold (Au), a Sn—Pb based material, a Sn—Ag based material, a Sn—Ag—Cu based material, a Sn—Bi based material, a Sn—Zn—Bi based material, a Sn—In based material, a Sn—Zn—Al based material, a Sn—Bi—Ag based material, or a combination thereof. In the meantime, the adhesive layer 142 may include two or more types of conductive particles 144. For example, in the case of the adhesive member 140 of the electronic device 100 according to an example embodiment of the present disclosure, the adhesive layer 142 may include both copper and nickel. Since copper has a higher conductivity than that of nickel, but nickel has excellent dispersibility for the adhesive, copper and nickel may be used together so as to be complementary to each other.

In the meantime, a diameter of the conductive particle 144 may be appropriately adjusted as desired for various implementations, and may be within a range from 2 μm to 6 μm. When the diameter of the conductive particle 144 is smaller than 2 μm, the diameter of the conductive particle 144 may be too small so that a contact probability between conductive particles 144 is lowered after attaching the adhesive member 140. Therefore, a possibility of electric conduction in a vertical direction is lowered. In contrast, when the diameter of the conductive particle 144 is larger than 6 μm, a size of the conductive particle 144 may be larger than a thickness d2 of the adhesive layer 142 so that adhesive strength of the adhesive member 140 may be lowered.

Even though it is not limited thereto, a content of the conductive particle 144 may be within a range from 1.0 weight % to 1.5 weight % with respect to the adhesive 143. When the content of the conductive particle 144 is less than the above-mentioned range, the conductivity may be insufficient and it may be hard to transmit a signal from the second substrate 130. When the content of the conductive particle 144 is more than the above-mentioned range, the adhesive strength may be lowered.

A thickness d2 of the adhesive layer 142 may be appropriately adjusted as desired for various implementations, and may be within a range from 5 μm to 10 μm. When the thickness d2 of the adhesive layer 142 is smaller than 5 μm, it is difficult to implement sufficient adhesive strength and when the thickness thereof exceeds 10 μm, the thickness of the adhesive member 140 is larger so that the conductivity in a vertical direction may be lowered.

Figure 2B:
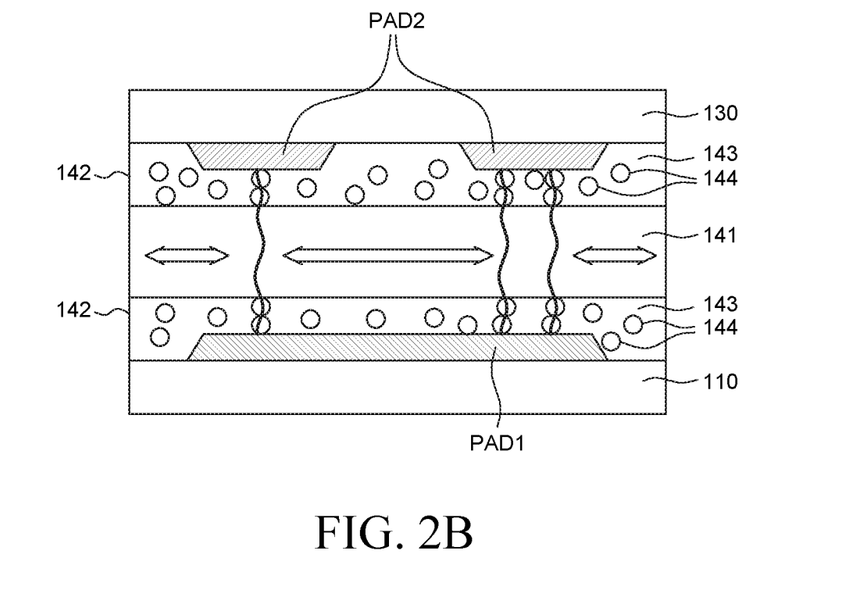
FIG. 2B is a schematic cross-sectional view of an adhesive member used for an electronic device according to embodiments of the present disclosure.

FIG. 2B is a schematic cross-sectional view of an adhesive member used for an electronic device according to an example embodiment of the present disclosure. In FIG. 2B, the adhesive member 140 is disposed between the pad electrode PAD1 of the plastic substrate 110 and the pad electrode PAD2 of the second substrate 130 and then the adhesive member 140 is finally cured through an adhering process to adhere the pad electrode PAD1 of the plastic substrate 110 and the pad electrode PAD2 of the second substrate 130 to each other.

Referring to FIG. 2B, the pad electrode PAD1 of the plastic substrate 110 and the pad electrode PAD2 of the second substrate 130 are accommodated in the adhesive layer 142 by a pressure applied during the adhering process. In this case, the thickness of the adhesive layer 142 is reduced due to the pressure and the pad electrodes PAD1 and PAD2 and the conductive particles 144, and the conductive fiber sheet 141 are in contact with each other in a vertical direction. That is, the conductive materials are in contact with each other in a vertical direction, so that the current flows between the pad electrode PAD1 of the plastic substrate 110 and the pad electrode PAD2 of the second substrate 130. The pad electrode PAD2 of the second substrate 130 may include two or more pad electrodes, as shown in the cross-sectional view of FIG. 2B.

Further, the adhesive member 140 used for the electronic device 100 according to an example embodiment of the present disclosure includes a conductive fiber sheet 141 so that the current may be conducted in a horizontal direction. That is, the current which moves in a vertical direction by the conductive particles 144 disposed between the adhesive layers 142 meets the conductive fiber sheet 141 to move also in a horizontal direction. That is, the adhesive member 140 of the present disclosure may conduct the current not only in the vertical direction, but also in the horizontal direction.

In this case, in order to ensure sufficient adhesion between the pad electrodes PAD1 formed of metal, the adhesive strength of the adhesive member 140 is desirably 300 gf/cm or higher and more desirably 500 gf/cm or higher. Further, in order to transmit signals between the electronic parts, a resistance of the adhesive member 140 is desirably 10Ω or lower and more desirably 3Ω or lower.

The electronic device 100 according to an example embodiment of the present disclosure uses the adhesive member 140 in which the plurality of conductive fiber sheets 141, and the adhesive layer 142 including the adhesive 143 and the conductive particles 144 are laminated to mechanically adhere two electronic parts to each other even at a low temperature and a low pressure and give excellent conductivity. By doing this, a crack of the pad electrode and a damage of a base film generated during the adhering process may be minimized.

Figure 3A:
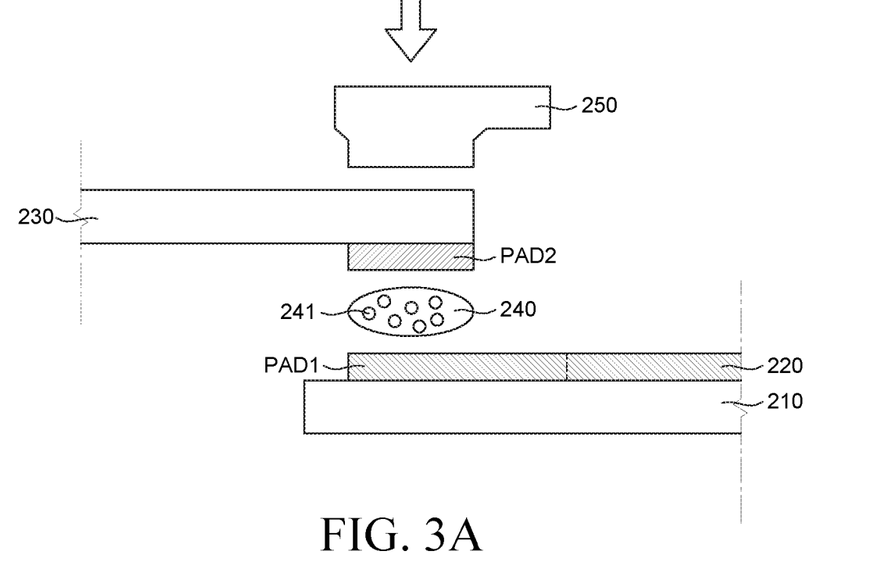
FIGS. 3A and 3B are schematic cross-sectional views of an electronic device according to a comparative example in which electronic parts are adhered using an anisotropic conductive film (ACF)
Figure 3B:
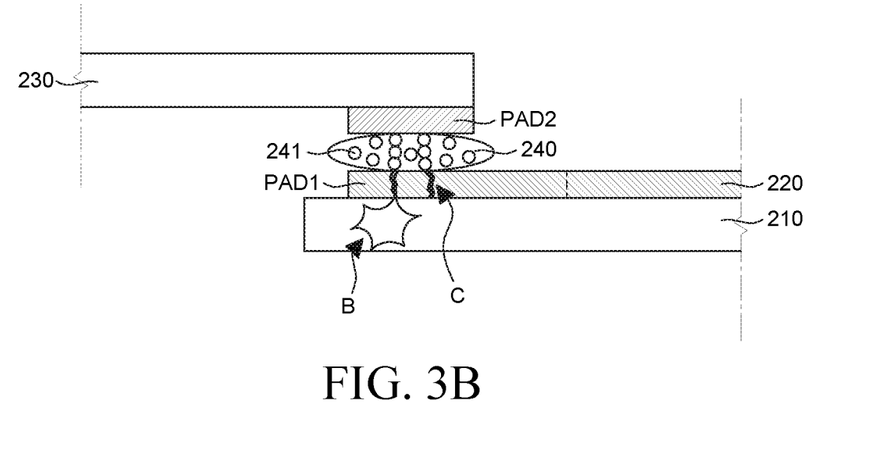

FIGS. 3A and 3B are schematic cross-sectional views for explaining an effect of an electronic device according to an example embodiment of the present disclosure. Specifically, FIGS. 3A and 3B are schematic cross-sectional views of an electronic device according to a comparative example in which electronic parts are adhered using an anisotropic conductive film (ACF). In FIGS. 3A and 3B, a process of adhering a pad electrode PAD1 of a plastic substrate 210 and a pad electrode PAD2 of a second substrate 230 using an anisotropic conductive film 240 is illustrated.

As illustrated in FIG. 3A, the anisotropic conductive film 240 is disposed between the pad electrode PAD1 on the plastic substrate 210 and the pad electrode PAD2 of the second substrate 230 and then a pressure is downwardly applied above the second substrate 230 using a pressure bonding tool 250 at a high temperature and a high pressure. The high pressure is applied between the pad electrode PAD1 on the plastic substrate 210 and the pad electrode PAD2 of the second substrate 230 through the pressure bonding tool 250 having a high temperature so that a thermal curing process and a compression bonding process are performed on the anisotropic conductive film 240. For example, the anisotropic conductive film 240 is thermally cured at a temperature of approximately 155° C. so that the pressure of 3 Mpa to 5 Mpa is applied using a pressure bonding tool 250 having a temperature of approximately 300° C.

As described above, in order to cure and adhere the anisotropic conductive film, a high temperature and a high pressure are required. However, the high temperature and the high pressure may cause damage on the plastic substrate 210 and the pad electrode PAD1 of the plastic substrate 210. Specifically, referring to FIG. 3B, when the anisotropic conductive film 240 is pressurized by a high temperature pressure bonding tool 250 to be thermally cured, a problem B in that the plastic substrate 210 is burned or melted due to the high temperature of the high temperature pressure bonding tool 250 may be caused. Generally, this is because a melting point or a glass transition temperature of the plastic substrate 210 is significantly lower than that of an organic substrate of the related art. Further, during the process of applying a pressure, a specifically high pressure is transmitted to a point where the conductive particles 241 in the anisotropic conductive film 240 is in contact with the pad electrode PAD1 so that a crack C may be generated on the pad electrode PAD1 and the plastic substrate 210 below the pad electrode PAD1.

However, the adhesive member 140 used for the electronic device 100 according to embodiments of the present disclosure may adhere the pad electrode PAD1 on the plastic substrate 110 and the pad electrode PAD2 of the second substrate 130 at a low temperature and a low pressure, thereby reducing or eliminating the burning or cracking issues that may occur in the comparative example shown in FIG. 3B.

Hereinafter, an effect of the adhesive member according to an example embodiment of the present disclosure will be described below through examples. However, the following Examples are set forth to illustrate the present disclosure, but the scope of the present disclosure is not limited thereto.

Specifically, a polyester fiber sheet is plated with copper/nickel to prepare a conductive fiber sheet of 5 µm. After laminating seven conductive fiber sheets, a first coating layer and a second coating layer containing an acrylic adhesive and copper/nickel are formed on an upper surface and a lower surface of a plurality of conductive fiber sheets to manufacture an adhesive member. In this case, the thicknesses of the first coating layer and the second coating layer are 7.5 µm and a content of copper and nickel contained in the first coating layer and the second coating layer is 1.2 weight % with respect to the acrylic adhesive.

After disposing an adhesive member according to Example between two metal pads, a pressure of 2.7 Mpa is applied to adhere two pads under a condition of 54° C. Next, an adhesive strength and a resistance of the adhesive member are measured. The adhesive strength of the adhesive member according to an example embodiment of the present disclosure is measured to be approximately 700 gf/cm and the resistance is measured to be 3Ω. Differently from the anisotropic conductive film of the related art which requires a temperature of 155° C. or higher and a pressure of 3 Mpa or higher for adhesion, the adhesive member 140 used for the electronic device 100 according to the example embodiment of the present disclosure is easily adhered even at a low temperature and a low pressure and shows excellent conductivity.

Hereinafter, among various applied examples to which the electronic device according to the embodiments of the present disclosure as described above is applied, a display device according to an example embodiment of the present disclosure will be described. The display device according to an example embodiment of the present disclosure includes the electronic device according to the embodiment of the present disclosure illustrated in FIG. 1. Specifically, the display device according to the example embodiment of the present disclosure includes a polarization control unit which may implement a 3D image as the electronic device according to the example embodiment of the present disclosure and a switchable lens. Hereinafter, among various application examples to which the electronic device according to the example embodiment of the present disclosure is applied, only a display device is described as an example, but the examples are not limited thereto.

Figure 4:
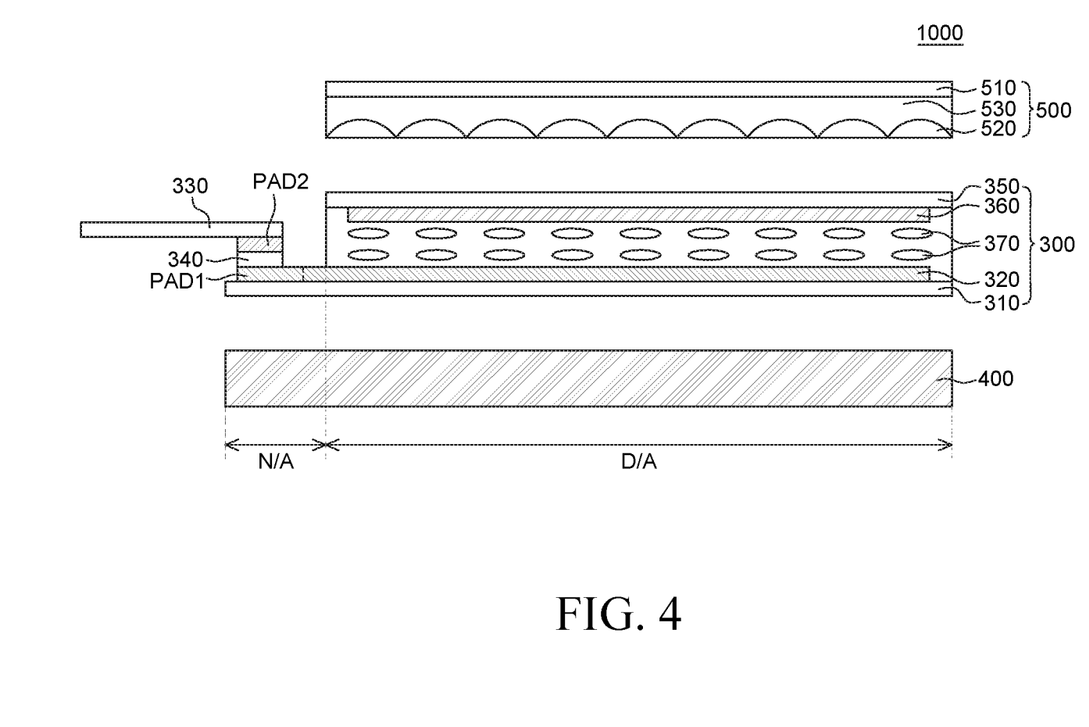
FIG. 4 is a schematic cross-sectional view of a display device according to embodiments of the present disclosure.

FIG. 4 is a schematic cross-sectional view of a display device according to an example embodiment of the present disclosure. Referring to FIG. 4, a display device 1000 includes a display panel 400, a polarization control unit 300, and a switchable lens 500. In FIG. 4, a structure of components of the display device 1000 is simply illustrated and a specific shape of a connection relationship and an arrangement relationship between components is omitted.

The display panel 400 is a device which displays an image. Examples of the display panel include an organic light emitting display device and a plasma display device which are self-emitting devices and a liquid crystal display device which requires a separate light source. The display panel 400 may include a display element and a driving circuit. For example, when the display panel 400 is an organic light emitting display device, the display panel 400 may include an organic light emitting element configured by a plurality of organic layers and various driving circuits which serve as circuit units for driving the organic light emitting element, such as a switching thin film transistor, a driving thin film transistor, and a capacitor.

The display panel 400 includes a display area D/A in which a display unit is disposed to display an image and a non-display area N/A which is disposed around the display area and does not display images.

The polarization control unit 300 is disposed on the display panel 400 and directly transmits the light which is emitted from the display panel 400 or linearly polarizes the light to supply the light to the switchable lens 500. For example, according to a polarization direction of light supplied from the polarization control unit 300, the light is directly transmitted to display a 2D image or traveling paths of light corresponding to a right eye image and light corresponding to a left eye image are divided to display a 3D image.

The polarization control unit 300 includes a first plastic substrate 310, a second plastic substrate 350, a first electrode 320 disposed on one surface of the first plastic substrate 310, a second electrode 360 disposed on one surface of the second plastic substrate 350, and a polarization control liquid crystal layer 370 disposed between the first plastic substrate 310 and the second plastic substrate 350.

In this case, the polarization control unit 300 includes a pad electrode PAD1 connected to the first electrode 320 and a flexible printed circuit board 330 electrically connected to the pad electrode PAD1 in a region corresponding to the non-display area N/A of the display panel 400. Further, an adhesive member 340 which electrically connects the flexible print circuit board 330 and the pad electrode PAD1 is disposed between the pad electrode PAD2 of the flexible print circuit board 330 and the pad electrode PAD1 on the first plastic substrate 310.

The polarization control unit 300 of the display device 1000 according to the example embodiment of the present disclosure corresponds to the electronic device 100 illustrated in FIG. 1. That is, the first and second plastic substrates 310 and 350, the first and second electrodes 320 and 360, the flexible printed circuit board 330, the adhesive member 340 illustrated in FIG. 4 are substantially the same as the plastic substrate 110, the conductive layer 120, the second substrate 130, and the adhesive member 140. Therefore, a redundant description thereof will be omitted.

Referring to FIG. 4, an orientation of the polarization control liquid crystal layer 370 of the polarization control unit 300 is changed by electric fields formed by the first electrode 320 and the second electrode 360. For example, in a state when the electric field is not applied, the liquid crystals 370 are oriented to change a vertically linear polarization of light incident from the display panel 400 to a horizontal linear polarization. In contrast, when the electric field is not applied, the liquid crystals are vertically arranged to transmit light.

Therefore, the orientation of the liquid crystals 370 of the polarization control unit 300 is changed by the first electrode 320 and the second electrode 360. The first electrode 320 and the second electrode 360 are turned on/off to change orientation of liquid crystals 370 of the polarization control unit 300. Therefore, the first electrode 320 and the second electrode 360 may be formed on the first plastic substrate 310 and the second plastic substrate 350 as a single electrode. In this case, the first electrode 320 and the second electrode 360 receive a driving signal from the flexible printed circuit board 330. That is, the first electrode 320 and the second electrode 360 receive signals from the pad electrode PAD2 of the flexible printed circuit board 330 through the pad electrode PAD1 connected to the first electrode 320 and the second electrode 360.

In FIG. 4, a structure in which the flexible printed circuit board 330 is connected only to the pad electrode PAD1 connected to the first electrode 320 is illustrated. However, the flexible printed circuit board 330 may be connected only to a pad electrode connected to the second electrode 360 or connected to both the pad electrode connected to the first electrode 320 and the pad electrode connected to the second electrode 360.

The adhesive member 340 is disposed between the pad electrode PAD2 of the printed circuit board 330 and the pad electrode PAD1 connected to the first electrode 320. The adhesive member 340 functions not only to physically adhere the flexible printed circuit board 330 and the first plastic substrate 310, but also to electrically connect the pad electrode PAD2 of the flexible printed circuit board 330 and the pad electrode PAD1 connected to the first electrode 320 so as to transmit the signal from the flexible printed circuit board 330 to the first electrode 320.

The adhesive member 340 includes a plurality of conductive fiber sheets and an adhesive layer, and the adhesive layer includes an adhesive and conductive particles. A specific structure thereof has been described with reference to FIGS. 2A and 2B, so that a specific description will be omitted.

The switchable lens 500 is disposed on the polarization control unit 300. The switchable lens 500 includes a base film 510 and a lens cell which is disposed on one surface of the base film 510. The lens cell includes a first lens layer 520 including a convex surface and a second lens layer 530 which is disposed between a convex surface of the first lens layer 520 and the base film 510 to have a concave surface. Light for a left eye image and light for a right eye image may be divided through the first lens layer 520 and the second lens layer 530 having different refractive indexes.

In the meantime, the switchable lens 500 illustrated in FIG. 4 is just an example, so that a shape and a structure of the switchable lens 500 may be designed in various forms if necessary. Further, in FIG. 4, even though it is illustrated that the switchable lens 500 is disposed above the polarization control unit 300, the switchable lens 500 may be disposed inside the polarization control unit 300.

The display device 1000 according to an example embodiment of the present disclosure connects the polarization control unit 300 and a driving module such as the flexible printed circuit board 330 using the adhesive member 340 including a plurality of conductive fiber sheets and an adhesive layer having an adhesive and conductive particles. The adhesive member 340 used in various embodiments of the present disclosure may implement sufficient adhesive strength and conductivity even at a low temperature and a low pressure, so that the crack of the pad electrodes PAD1 and PAD2 and the damage of the base film generated during the adhering process may be minimized.

One or more example embodiments of the present disclosure can also be described as follows:

According to an aspect of the present disclosure, an electronic device includes a plastic substrate, a conductive layer formed on the plastic substrate, a single pad electrode extended from the conductive layer, a module electrically connected to the single pad electrode, and an adhesive member which is disposed between the single pad electrode and the module and has a conductive fiber sheet.

The adhesive member may include a conductive fiber sheet and an adhesive layer which is disposed on both surfaces of the conductive fiber sheet and includes conductive particles and an adhesive.

The conductive fiber sheet may be formed of a polymer fiber and a metal material coated on the polymer fiber.

A plurality of conductive fiber sheets may be provided and a thickness of each conductive fiber sheet may be 4 μm to 7 μm.

The adhesive may be formed of an acrylic compound and the conductive particles may include metal particles having a diameter of 2 μm to 6 μm.

The conductive particles may be copper and nickel.

A content of the conductive particles may be 1.0 to 1.5 weight % with respect to the adhesive.

An adhesive strength of the adhesive member may be 300 gf/cm or higher and a resistance of the adhesive member may be 10Ω or lower.

The plastic substrate may be a polymer film formed of polyethylene terephthalate (PET) or polycarbonate (PC).

The module may include a plurality of pad electrodes and the single pad electrode may be electrically connected to the plurality of pad electrodes of the module by means of the adhesive member.

According to an another aspect of the present disclosure, a display device includes a display panel including a display area in which a display unit is disposed and a non-display area which encloses the display area, a polarization control unit which is disposed on the display panel and includes a polarization control liquid crystal layer, and a switchable lens which refracts or transmits light passing through the polarization control unit in which the polarization control unit includes a first plastic substrate, a second plastic substrate opposing to the first plastic substrate, a first electrode disposed on one surface of the first plastic substrate, a second electrode disposed on one surface of the second plastic substrate, and the polarization control liquid crystal layer disposed between the first plastic substrate and the second plastic substrate, the polarization control unit includes a pad electrode extended from at least one of the first electrode and the second electrode and the pad electrode is electrically connected to a flexible printed circuit board by an adhesive member including a plurality of conductive fiber sheets and an adhesive layer which is disposed on both surfaces of the plurality of conductive fiber sheets and includes conductive particles and an adhesive.

The pad electrode may be a single electrode connected to the first electrode and the second electrode.

The conductive fiber sheet may be formed of a polymer fiber and a metal material coated on the polymer fiber.

The adhesive may include an acrylic compound and the conductive particles may include metal particles having a diameter of 2 μm to 6 μm.

An adhesive strength of the adhesive member may be 300 gf/cm or higher and a resistance of the adhesive member may be 10Ω or lower.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical spirit of the present disclosure. The scope of the technical spirit of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An electronic device, comprising:
a first substrate;
a conductive layer formed on the first substrate;
a first pad electrode that is electrically connected to and extends from the conductive layer;
a second substrate electrically connected to the first pad electrode; and
an adhesive member which is disposed between the first pad electrode and the second substrate, and
wherein the adhesive member includes a plurality of conductive fiber sheets and adhesive layer which is disposed on both surfaces of the plurality of conductive fiber sheets and the adhesive layer includes conductive particles and an adhesive, and
wherein each of the plurality of conductive fiber sheets is formed of a non-conductive polymer fiber sheet and a metal material coated on the non-conductive polymer fiber sheet.

2. The electronic device according to claim 1, wherein the second substrate is electrically connected to a driving unit configured to supply signals to one or more electronic components on the first substrate.

3. The electronic device according to claim 2, wherein the second substrate comprises a flexible circuit film that is electrically connected to a printed circuit board on which the driving unit is disposed.

4. The electronic device according to claim 1, wherein the second substrate is a flexible printed circuit board.

5. The electronic device according to claim 1, wherein a thickness of each of the conductive fiber sheets is within a range from 4 μm to 7 μm inclusive.

6. The electronic device according to claim 1, wherein the adhesive is formed of an acrylic compound.

7. The electronic device according to claim 1, wherein the conductive particles comprise metal particles having a diameter within a range from 2 μm to 6 μm, inclusive.

8. The electronic device according to claim 1, wherein the conductive particles include copper and nickel.

9. The electronic device according to claim 8, wherein a first portion of the conductive particles includes copper particles and a second portion of the conductive particles includes nickel particles.

10. The electronic device according to claim 1, wherein a content of the conductive particles is within a range from 1.0 to 1.5 weight %, inclusive, with respect to the adhesive.

11. The electronic device according to claim 1, wherein an adhesive strength of the adhesive member is 300 gf/cm or higher and a resistance of the adhesive member is 10Ω or lower.

12. The electronic device according to claim 1, wherein the first substrate is a polymer film formed of at least one of polyethylene terephthalate (PET) or polycarbonate (PC).

13. The electronic device according to claim 1, wherein the second substrate includes a plurality of second pad electrodes, and the first pad electrode is electrically connected to the plurality of second pad electrodes of the second substrate by the adhesive member.

* * * * *

UNITED STATES PATENT AND TRADEMARK OFFICE
CERTIFICATE OF CORRECTION

PATENT NO. : 11,016,350 B2
APPLICATION NO. : 15/842585
DATED : May 25, 2021
INVENTOR(S) : Ahn et al.

It is certified that error appears in the above-identified patent and that said Letters Patent is hereby corrected as shown below:

In the Claims

Column 13, Claim 1, Line 29:
"conductive fiber sheets and adhesive layer"
Should read:
--conductive fiber sheets and an adhesive layer--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*